United States Patent [19]

Andersen et al.

[11] 4,160,809

[45] Jul. 10, 1979

[54] MODIFIED PYROHYDROLYSIS PROCESS FOR SPENT ALUMINUM REDUCTION CELL LININGS

[75] Inventors: John N. Andersen, Moraga; Norman Bell, Livermore, both of Calif.

[73] Assignee: Kaiser Aluminum & Chemical Corporation, Oakland, Calif.

[21] Appl. No.: 927,084

[22] Filed: Jul. 24, 1978

[51] Int. Cl.$^2$ ............................. C01F 7/04; C01B 7/19
[52] U.S. Cl. ..................... 423/119; 423/111; 423/133; 423/484; 423/489; 423/DIG. 16; 423/240
[58] Field of Search ............... 423/111, 119, 484, 496, 423/489, 133; 204/67

[56] References Cited

U.S. PATENT DOCUMENTS

| | | | |
|---|---|---|---|
| 3,073,676 | 1/1963 | Mollard et al. | 423/484 |
| 4,113,832 | 9/1978 | Bell et al. | 423/484 |

*Primary Examiner*—Herbert T. Carter
*Attorney, Agent, or Firm*—Paul E. Calrow; Andrew E. Barlay

[57] ABSTRACT

Fluoridic spent and waste materials, such as are generated in electrolytic aluminum reduction systems, are pyrohydrolyzed in a fluidized bed reactor. For fluidization of these materials, as well as for the combustion of carbon present in the materials, an $O_2$-containing gas stream, containing at least about 90% by volume $O_2$, is employed. This results in the generation of an HF-containing offgas of significantly increased HF level, which can be employed for the manufacture of an $AlF_3$ product of at least about 85% by weight $AlF_3$ content from hydrated alumina. The offgas having the increased HF content can also be employed for the production of highly concentrated HF acid with significantly lower energy requirement needed for concentration than in conventional systems.

7 Claims, 1 Drawing Figure

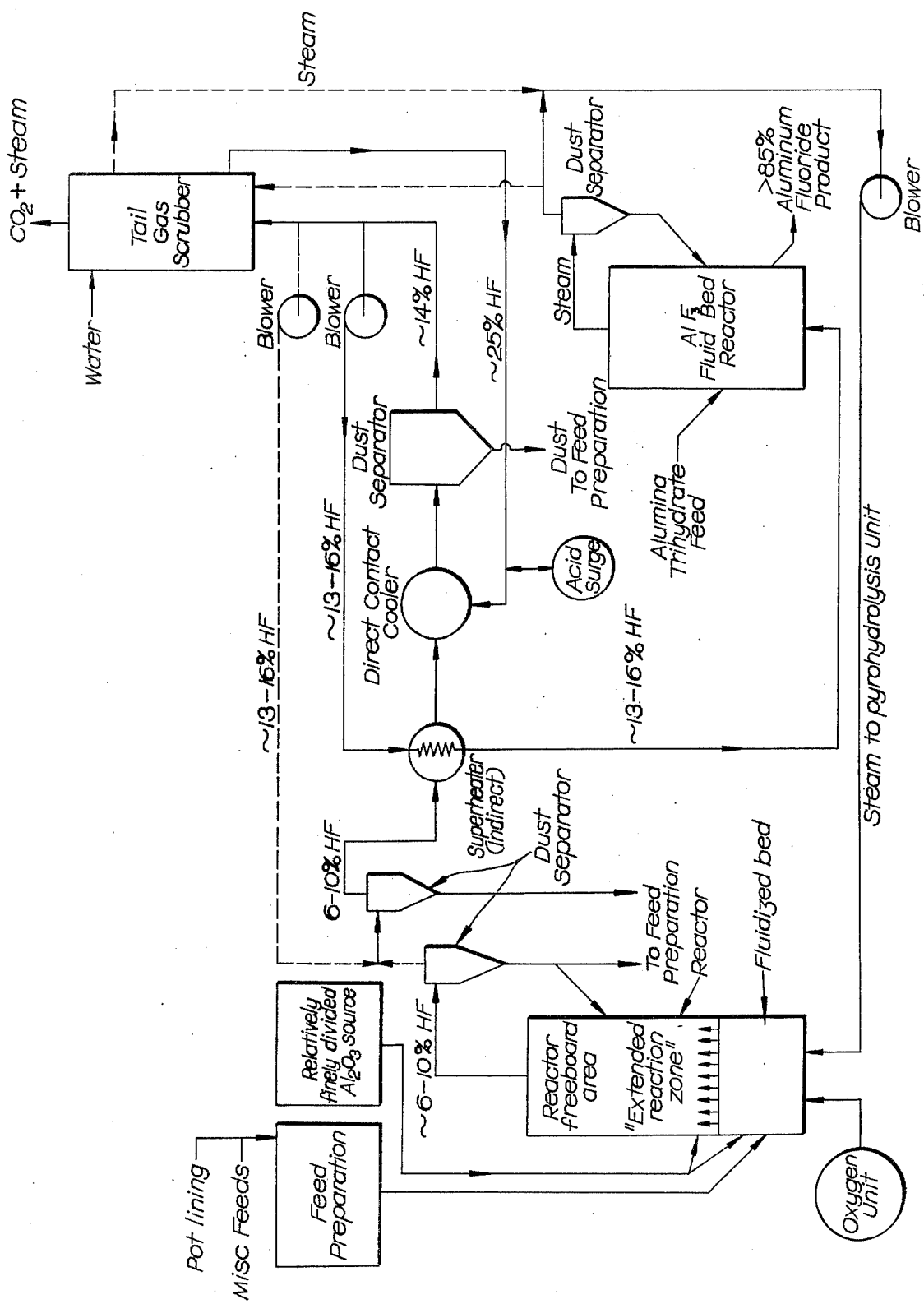

MODIFIED PYROHYDROLYSIS PROCESS FOR SPENT ALUMINUM REDUCTION CELL LININGS

BACKGROUND OF THE INVENTION

This invention relates to an improved pyrohydrolysis process for spent and waste materials generated in electrolytic aluminim reduction sytems. More particularly, it concerns a pyrohydrolysis process wherein fluidization of the fluoridic waste material charge is accomplished by use of an $O_2$-containing gas having an $O_2$ content of at least about 90% by volume.

Pyrohydrolysis of spent and waste materials generated in electrolytic aluminum reduction systems has been described in detail in copending application Ser. No. 855,506 now U.S. Pat. No. 4,113,832 to Bell et al. The process described involves the pyrohydrolysis of spent aluminum reduction cell linings and other fluoridic waste materials, such as floor sweeping, channel cleanings and spent alumina from reduction cell offgas scrubbing systems, in a fluidized bed reactor. Fluidization and pyrohydrolysis generates an NaF and HF-containing offgas from which NaF is recovered and the NaF-free gas, containing the Hf constituent, is used for $AlF_3$ manufacture and/or production of anhydrous HF. The clinker product of the pyrohydrolysis is essentially $Na_2O \cdot xAl_2O_3$, which is utilized as a source of $Al_2O_3$ and $Na_2O$, for example by the well-known Bayer process. In this process both NaF and HF are produced, however, the HF content of the offgas is relatively low due to the simultaneous generation of NaF and also since air is used as a fluidizing medium for the spent material charge. Due to the diluteness of the HF in the gas, the $AlF_3$ product, which is made by contact of HF with $Al_2O_3$ in a separate fluidized bed reactor, has an $AlF_3$ content in the neighborhood of about 13-20% by weight.

In copending application Ser. No. 910,416 to Andersen et al, filed May 30, 1978, an improvement on the above discussed process is described. In the Andersen et al application, the pyrohydrolysis reactor, where the fluidization and pyrohydrolysis take place, is provided with an "extended" reaction zone in the freeboard area of the reactor. The extended reaction zone, in which vapor-phase Na-containing compounds, such as NaF and $Na_2O$, are contacted with a relatively finely divided source of $Al_2O_3$ in the presence of steam, allows essentially complete conversion of the vaporized NaF to HF and also the formation of $Na_2O \cdot xAl_2O_3$ by the extended reaction of the vaporized $Na_2O$ with the $Al_2O_3$. This improved process provides an essentially NaF-free offgas in which the HF content is significantly increased due to the conversion of the NaF constituent to HF in the extended reaction zone. This higher HF content in the offgas renders the offgas more suitable for the manufacture of anhydrous HF and/or $AlF_3$ than previous processes. However, the HF is still considerably diluted due to the $CO_2$-content of the offgas which has been generated by the combustion of the carbon content of the waste materials, the excess water vapor required to drive the pyrohydrolysis reaction to completion and the large volume of nitrogen introduced with the air used for combustion.

It has now been found that the HF content of the pyrohydrolysis offgas can be further increased by a considerable degree using as fluidizing medium and as a source for combustion of the carbon content of the waste material charge, a stream which contains at least about 90% by volume $O_2$. Using the essentially nitrogen-free stream for these purposes, in combination with the expanded reaction zone concept where a relatively finely divided source of $Al_2O_3$ is contacted with the vaporized Na-components of the offgas, results in a more than 300% increase in HF content of the Na-free offgas. This offgas, as will be shown hereinafter, can be readily employed for the production of an $AlF_3$ product containing at least about 85% by weight $AlF_3$ and/or a highly concentrated HF with a fraction of the energy required in comparison to prior art processes.

BRIEF SUMMARY OF THE INVENTION

An improved process for recovering fluoridic values from carbon-containing spent and waste materials, such as are generated in electrolytic aluminum reduction system is provided by pyrohydrolysis of these materials in a fluidized bed reactor in the presence of steam. In the process, the fluidized bed reactor is provided with an expanded reaction zone above the fluidized bed in the reactor freeboard area by contacting the vaporized Na-containing compounds, such as NaF and $Na_2O$ with a relatively finely divided source of $Al_2O_3$ in the presence of steam. This extended reaction provides an essentially NaF-free offgas having an increased HF content. This HF content can be further increased by the improved process of the invention wherein the medium introduced for the fluidization of the waste material charge and for the combustion of its carbon content is an $O_2$-containing gas of at least about 90% by volume $O_2$ content. The reduction of the $N_2$ diluent from this fluidizing and combusting medium increases the HF content of the offgas by a significant degree and permits the production of an $AlF_3$ product of at least about 85% by weight $AlF_3$ content. Due to the significantly increased HF content of the offgas, manufacture of highly concentrated HF can proceed with considerably lower energy input than required for systems employing air as fluidizing and carbon combusting medium.

BRIEF DESCRIPTION OF THE FIGURE

The FIGURE schematically shows the pyrohydrolysis of spent and waste materials generated by electrolytic aluminum reduction systems. The HF generated by pyrohydrolysis in the fluidized bed reactor and the extended reaction zone is, after cooling and conventional dust removal, introduced in a tail gas scrubber for purging steam and other inert gases. From this scrubber high concentration HF is recovered which is used as a direct contact cooling medium, thus increasing the HF content of the gas stream. The concentrated HF gas stream is then used for the production of an $AlF_3$ product of 85% $AlF_3$ content. It can also be used for the preparation of highly concentrated aqueous HF and ultimately anhydrous HF.

DETAILED DESCRIPTION OF THE INVENTION

An improved process is provided for the pyrohydrolysis of fluoridic spent and waste materials generated in electrolytic aluminum reduction system. More particularly, the process relates to the pyrohydrolysis of carbon-containing, fluoridic spent and waste materials in a fluidized bed reactor, wherein an extended reaction zone is provided in the reactor freeboard area by introduction of a relatively finely divided source of $Al_2O_3$ into this area, and by using a gas, containing at least about 90% by volume $O_2$, for the combustion of the carbon content and for the fluidization of the spent and waste material charge.

For the purposes of this invention "pyrohydrolysis" of the fluoridic spent and waste materials of electrolytic aluminum reduction systems refers to the following reactions:

$$2NaF + H_2O \rightleftarrows 2HF + Na_2O \quad (1)$$

$$2AlF_3 + 3H_2O \rightleftarrows 6HF + Al_2O_3 \quad (2)$$

$$Na_2O + xAl_2O_3 \rightarrow Na_2O \cdot xAl_2O_3 \quad (3)$$

These reactions take place at elevated temperatures, generally above about 900° C. The water required for pyrohydrolysis reactions (1) and (2) is usually introduced as liquid water, combined water or as steam to the fluidized bed or as a combination of these.

The expression "spent and waste materials of electrolytic aluminum reduction systems" encompass among others, carbonaceous cell or pot linings which are recovered after their useful lives have expired. Typical composition of such pot linings is shown in Table I.

TABLE I
TYPICAL COMPOSITION OF SPENT POT LININGS

| Elements | % by Weight | Elements | % by Weight |
| --- | --- | --- | --- |
| Al | 16.1 | Ca | 1.4 |
| F | 10.5 | Fe | 0.8 |
| Na | 11.8 | Si | 0.7 |
| Li | 0.3 | CN | 0.2 |
| C | 32.1 | $O_2, CO_3, Cl$, etc. | 26.1 |

In addition to the spent cell linings, the charge to the fluidized bed reactor can also contain floor sweepings, trench and channel cleanings, as well as the spent alumina scavenger of reduction offgas scrubbing systems. Typical compositions of these spent and waste materials are shown in Tables II and III.

TABLE II
TYPICAL COMPOSITION OF COMBINATIONS OF CHANNEL AND TRENCH CLEANINGS WITH FLOOR SWEEPINGS

| Element | % by Weight |
| --- | --- |
| Al | 32.0 |
| F | 25.5 |
| Na | 13.5 |
| Fe | 1.0 |
| Si | 0.4 |
| Others | Balance |

These spent and waste materials are generally admixed prior to charging the materials into the fluidized bed reactor.

In the instant invention an "extended" reaction zone, such as fully described in copending application Ser. No. 910,416, filed May 30, 1978 (Andersen at al), is employed. This "extended" zone is generated in the freeboard area of the fluidized bed reactor by introducing a relatively finely divided source of $Al_2O_3$ in the reactor. As shown in detail in the above-referenced applicaton, the source of $Al_2O_3$ can be introduced into the reactor by adding it to the charge, or in the vicinity of the fluidized bed surface, or in a split stream or both. The size of the relatively finely divided source of $Al_2O_3$ is kept in the range of about 40-500 microns, this relatively small particle size allows elutriation or "lifting out" of the $Al_2O_3$ from the fluidized bed when admixed with the charge. It provides a reactive surface for reaction with the vaporized Na-containing constituents of the pyrohydrolysis offgas and also due to its small size, will be heated rapidly in or in the vicinity of the fluidized bed thus avoiding cooling of the extended reaction zone.

The purpose of the introduction of the relatively finely divided $Al_2O_3$ source in the free board area of the fluidized bed reactor is to react with the $Na_2O$ formed in reaction (1) and thus shift the equilibrium in favor of the formation of HF, with simultaneous formation of $Na_2O \cdot xAl_2O_3$ according to reaction (3). This provides for the generation of an essentially NaF-free offgas and increased HF yield.

In order for the pyrohydrolysis reaction to proceed rapidly and to a high degree of completion, it is necessary to meet a series of interrelated criteria. Favoring the reaction rate and the degree of completion of the pyrohydrolysis reaction are (1) elevated temperature (above about 900° C., generally in the range of about 900°–1300° C.), (2) efficient gas to solids contact, (3) the length of time the reactants are in the reaction zone, (4) the removal of intermediate reaction products (such as the combination of $Na_2O$ with $Al_2O_3$ in the form of $Na_2O \cdot xAl_2O_3$) and (5) the maintenance of a high partial pressure of water vapor in the reaction zone. Copending application Ser. No. 855,506 now U.S. Pat. No. 4,113,832 employs a fluid bed reactor using air for combustion of the carbon in the criteria. Copending application Ser. No. 910,416, provides an improved means of extending the reaction zone residence time, bettering the gas to solids contact efficiency and significant reduction of the volatile sodium compounds in the offgases.

It has now been found that a further, significant improvement in the pyrohydrolysis process can be achieved by the use of a high oxygen content stream in place of air for combustion. This improvement of the process, in conjunction with the use of an HF scrubber for the removal of excess steam and combustion products and the utilization of the generated aqueous HF for the cooling of the offgas by direct contact, can generate, as will be discussed in detail hereinafter, a gas stream with an HF content sufficiently high to produce an $AlF_3$ product of at least about 85% by weight $AlF_3$ content.

The use of a stream, containing at least about 90% by volume $O_2$, for combustion of the carbon content of the charge eliminates the diluent effect of the nitrogen associated with the common use of air for this purpose. In addition, the heat load required to bring the nitrogen content of the air to reaction temperature is eliminated, thus reducing the heat input required for maintaining reactor temperature. Consequently, this use of a gas of high $O_2$ content also reduces the total combustion offgas volume and allows the partial pressure of water vapor be increased in the fluidized bed reactor. This enhances the pyrohydrolysis reaction, thus substantially increasing the HF concentration in the offgas and also permitting the pyrohydrolysis reaction to proceed at lower operating temperatures. In turn, the increase in offgas HF concentration results in increased fluidized bed reactor capacity which improves the operational efficiency of the entire pyrohydrolysis process.

The advantages obtained by the use of a fluidizing gas containing at least about 90% by volume $O_2$ are manifold. Thus, for example, the hydrogen fluoride content of the offgas generated and removed from the pyrohydrolysis reactor, can be approximately 6–10% by volume. This high HF content offgas, particularly if it is directly cooled with a liquid of about 25% HF content such as is obtainable in the novel system of the invention and as is shown hereafter, allows preparation of an $AlF_3$ product of more than about 85% by weight $AlF_3$ content. This product can be made by contacting the HF-containing gas with alumina trihydrate ($Al_2O_3 \cdot 3H_2O$) in a fluidized bed reactor. The utilization of alumina trihydrate in the production of $AlF_3$ not only produces the desired product, but it also generates steam which can be readily employed for the pyrohydrolysis of a fresh charge of spent pot lining. This additional feature of the invention results in significant energy savings since the steam requirement for pyrohydrolysis can be generated in the system without the necessity of outside energy sources.

The operation of the novel pyrohydrolysis system, using oxygen as the fluidizing and combustion medium, will be further explained with reference to the FIGURE.

As shown in the FIGURE, the spent pot lining charge is introduced into the pyrohydrolysis reactor where upon charging of oxygen (at least about 90% by volume $O_2$ content) and steam, combustion of the carbonaceous constituents, and generation of hydrogen fluoride containing offgas is achieved at temperatures in excess of about 900° C., usually within the range of about 900°–1300° C. In order to convert the volatilized Na-containing components of the offgas, a relatively finely divided source of $Al_2O_3$ is introduced either in the fluidized bed, or in the "extended reaction zone" or into both places. The offgases generated by the combustion and pyrohydrolysis of the spent pot lining will contain besides HF, also steam and $CO_2$, as well as entrained solids. Due to the use of $O_2$ for combustion, the diluting effect of nitrogen is minimized and the HF-content of the offgas will be about 6–12% by volume. After removal of the entrained solids the offgas is cooled. In an advantageous embodiment of the invention the hot gases exiting from the reactor can be cooled directly with a cold stream of HF-containing gas, such as shown by the dotted lines in the FIGURE. Since this is a recycle stream and there is no heat removal from the system, the quantity of cooling gas used affects the intermediate concentration of HF, but has no effect on the HF concentration in the product gases. Subsequent cooling in a direct contact cooler, such as also shown in the FIGURE, with a highly concentrated HF stream, for example such as one recovered from the tail gas scrubber, can increase the concentration of the gas, for example up to about 13–16% by volume. The cooled HF-containing stream is then introduced into a scrubbing unit where water is employed as a scrubbing medium. The scrubber offgas will be free of HF and will contain mainly water vapor and $CO_2$. The aqueous HF stream recovered from the scrubber will have an HF content of about 25% by weight. A portion of the steam discharged from the scrubber unit may be recycled to the pyrohydrolysis unit as shown.

The aqueous HF recovered from the scrubber unit can be employed for making anhydrous HF in addition to, as shown in the FIGURE, for the direct cooling of the HF-containing offgas stream. The higher than usual HF-content of the aqueous stream allows its ready conversion to anhydrous HF by conventional means. When the aqueous stream is used primarily for direct cooling of hot offgas, a gaseous product which has an increased HF content is obtained, for example about 13–16% by volume.

This stream, containing about 13–16% by volume of HF, is utilized if desired for the production of $AlF_3$. While the prior art generally avoided the use of alumina trihydrate for the manufacture of $AlF_3$, the instant process prefers the use of this starting material. In the prior art processes the water content of the hydrate would have posed problems since the heat of reaction generated by the low HF content of the gas stream is insufficient to vaporize the water content of the trihydrate and to maintain the required temperature of the gaseous and solid reactants.

In the present process the by-product steam of the $AlF_3$ production is also utilized. The steam discharged from the $AlF_3$ fluid bed reactor is used to provide a major portion of the steam requirement for the pyrohydrolysis reaction, thus providing a favorable heat and energy balance, surpassing the effectiveness of prior art systems. Use of the offgas from the $AlF_3$ fluidized bed reactor as the source of steam for the pyrohydrolysis reactor recycles trace quantities of unreacted HF. This increased the overall HF recovery and eliminates a possible environmental problem. In addition, the aluminum hydrate starting material is less costly than calcined alumina; also the $AlF_3$ product, due to its high, more than about 85% by weight, $AlF_3$ content, is an economically more valuable product than the prior art $AlF_3$ products of about 15% $AlF_3$ content.

Thus, it can be observed from the system shown that by using a fluidizing and combustion promoting gas of at least about 90% $O_2$ content, the entire pot lining recovery process can be made more efficient both from a technical and an economical point of view.

The following example will provide further insight in the operation of the novel system.

EXAMPLE

Spent pot lining, having a composition shown in Table III was mixed with miscellaneous spent and waste materials from the electrolytic aluminum reduction system. These materials included floor sweepings and channel cleanings and the composition of the combined charge is shown in Table IV.

TABLE III

COMPOSITION OF SPENT POT LINING

| Elements | % by Weight | Elements | % by Weight |
|---|---|---|---|
| Al | 14.8 | Ca | 1.3 |
| F | 13.8 | Fe | 0.7 |
| Na | 15.5 | Si | 0.7 |
| Li | 0.5 | CN | 0.3 |
| C | 29.6 | $O_2$, $CO_3$, Cl, etc. | 22.8 |

TABLE IV

COMPOSITION OF FEED TO PYROHYDROLYSIS UNIT

| Elements | % by Weight | Elements | % by Weight |
|---|---|---|---|
| Al | 19.0 | Ca | 1.2 |
| F | 16.2 | Fe | 0.6 |
| Na | 14.8 | Si | 0.6 |
| Li | 0.3 | CN | 0.2 |
| C | 24.2 | $O_2$, $CO_3$, Cl, etc. | 22.9 |

The pyrohydrolysis reactor, operating at about 1200° C. was charged with the feed at the rate of 4.61 t/h. In addition, a relatively finely divided source of $Al_2O_3$, containing 86.4% by weight $Al_2O_3$ (as determined after heating to 1000° C. for about three hours) was also added to the reactor at the rate of about 0.30 t/h. The particle size of the $Al_2O_3$ source was in the range of about 200 to 400 microns.

A fluidizing and combustion supporting gas, containing about 95% by volume $O_2$ was charged to the reactor at the rate of about 2440 m³/h together with steam which was introduced at the rate of about 14,400 m³/h. The offgas generated by the pyrohydrolysis was conducted through conventional dust separators and the accumulated dust, consisting in essence of finely divided feed and $Al_2O_3$ source, was recycled to feed preparation. The offgas, which was freed of most of its entrained solids content, was then cooled to about 1000° C. by recycle of cooler gas and passage through the superheater as shown in the FIGURE. The gas stream was then conducted to a direct contact cooler where cooling of the offgas to about 200° C. was accomplished by contact with an aqueous stream of about 25% by volume HF content. The cooled offgas, which now had an HF content of about 14% by volume, was then subjected to a final solids separation step, where essentially all of the dust was removed. The dust-free stream, containing HF 14%, $CO_2$ 20% and steam 64% by volume, was then separated into two streams. A stream was heated to about 425° C. in the superheater and then employed for $AlF_3$ production; while the remaining portion was introduced in a scrubber unit in counter current flow to the aqueous scrubbing medium. The relative proportions of these two gas streams were controlled in such a manner to utilize all of the HF content of the offgas stream to produce an $AlF_3$ product of 85-90% by weight $AlF_3$ content at a production rate of 1.09 t/h. The scrubbed offgas stream free of HF and consisting of $CO_2$ and water vapor was released to the atmosphere, while the produced aqueous HF stream of about 25% HF content was used to directly cool HF-containing offgas from the reactor. The volume of cooling agent was controlled to obtain a temperature reduction of the offgas from about 1200° C. to about 200° C.

A portion of the steam effluent from the scrubber was introduced into the pyrohydrolysis reactor.

The dust-free offgas stream of about 14% by volume HF content which was divided out of the main stream going into the scrubber was preheated to about 425° C. in the superheater by indirect contact with incoming offgas from the reactor, then it was used to make $AlF_3$ product in a fluidized bed unit consisting of at least one and preferably of three series connected fluidized beds. The fluidized bed reactor was operated at about 550° C. and $Al_2O_3.3H_2O$ was charged to the reactor at the rate of about 1.20 t/h to provide for the above-mentioned production rate. The steam discharged from the reactor, after removal of entrained solids, was utilized for the pyrohydrolysis of the spent pot lining while the produced $AlF_3$ of about 85–90% by weight $AlF_3$ content was employed in the electrolytic aluminum reduction system as electrolyte.

The $AlF_3$ production unit does not have to operate continuously during the entire pyrohydrolysis process and production of $AlF_3$ can be made optional. If the $AlF_3$ production unit is operating at a reduced rate or does not operate, more, or all of the HF-containing offgas can be utilized for the generation of highly concentrated aqueous anhydrous HF. Thus, the instant system provides a highly desirable operating flexibility.

While there have been shown and described hereinabove possible embodiments of the invention, it is to be understood that the invention is not limited thereto and that various changes, alterations and modifications can be made thereto without departing from the spirit and scope thereof as defined in the appended claims.

What is claimed is:

1. In the process of recovering valuable components from carbon and fluoride-containing aluminous spent and waste materials generated in electrolytic aluminum reduction systems by subjecting the spent and waste materials to pyrohydrolysis in the presence of steam in a fluidized bed reactor having a fluidized bed and a freeboard area above the bed at a temperature within the range of about 900° C. to about 1300° C., the improvement comprising the combination of steps of
    (a) combusting the carbon content of the spent and waste materials in the fluidized bed with an $O_2$-containing stream having an $O_2$ content of at least about 90% by volume thus generating a hot offgas substantially free of nitrogen and containing HF and vaporized Na-containing compounds;
    (b) establishing an extended reaction zone in the freeboard area of the reactor by contacting the hot offgas with a relatively finely divided source of $Al_2O_3$ having a particle size within the range of about 40 to about 500 microns whereby the Na-containing vapors are converted to HF and $Na_2O.xAl_2O_3$;
    (c) cooling the hot, HF-containing offgas by direct contact with an aqueous HF-containing stream and conducting the cooled offgas to a scrubber for the removal of its HF content by scrubbing with an aqueous medium, while generating a steam and inert gas containing scrubbed offgas;
    (d) recovering the aqueous HF from the scrubber and using at least a portion thereof for cooling hot HF-containing offgas generated in the fluidized bed reactor;
    (e) recovering an HF-containing side stream from the cooled HF-containing offgas prior to scrubbing of the offgas with the aqueous medium and employing the HF-containing side stream for the production of an $AlF_3$ product of at least about 85% by weight $AlF_3$ content in a fluidized bed reactor using as alumina source alumina trihydrate; and
    (f) recovering the $AlF_3$ product and steam from the $AlF_3$ reactor and recycling the steam to the pyrohydrolysis reactor.

2. Process according to claim 1, wherein the temperature in the fluidized bed reactor is kept within the limits of about 1000° C. and about 1200° C.

3. Process of claim 1, wherein at least a portion of the aqueous HF-containing stream is used for making anhydrous HF.

4. Process according to claim 1, wherein all of the aqueous HF stream recovered from the scrubber is employed for cooling hot HF-containing offgas by direct contact.

5. Process according to claim 1, wherein the HF content of the hot offgas generated in the pyrohydrolysis reactor is about 6–10% by volume and after direct cooling with the aqueous HF-containing stream from the scrubber the HF content of the offgas increases up to about 13–16% by volume and this gas is subjected to scrubbing with an aqueous medium.

6. Process according to claim 5, wherein scrubbing of the offgas with an aqueous medium generates an aqueous HF containing up to about 25% by weight HF.

7. Process according to claim 1, wherein the HF-containing side stream, used for the production of an $AlF_3$ product of at least 85% by weight $AlF_3$ content in a fluidized bed reactor, is preheated to the temperature required for production of $AlF_3$ by heat exchange through indirect contact with the hot offgas generated in the fluidized bed reactor.

* * * * *